March 26, 1968     L. L. WEISGLASS     3,374,706

VARIABLE CONTRAST LIGHT SOURCE FOR CONDENSER ENLARGERS

Filed June 1, 1965

INVENTOR
Louis L. WEISGLASS
BY
ATTORNEY

United States Patent Office 3,374,706
Patented Mar. 26, 1968

3,374,706
VARIABLE CONTRAST LIGHT SOURCE FOR CONDENSER ENLARGERS
Louis L. Weisglass, New York, N.Y., assignor to Simmon Brothers, Inc., Woodside, N.Y., a corporation of New York
Filed June 1, 1965, Ser. No. 460,048
4 Claims. (Cl. 88—24)

ABSTRACT OF THE DISCLOSURE

A variable contrast light source for condenser enlargers is shown including a light mixing chamber and controllable means for passing a plurality of filters between the light source and the mixing chamber, the light being cooled by a blower, the enlarger lens being carried at the end of a bellows structure.

---

The present invention relates to a variable contrast light source for condenser enlargers which is readily adaptable for use with variable contrast paper to produce prints of variable contrast.

It is now well known in the art to utilize filter devices which are disposed in the light beam above the condenser system of a photographic printer or enlarger or positioned in the light beam for coloring the light falling upon the sensitized paper during the making of a print or enlargement. The difficulty with such previous systems has been due to the fact that although filters of relatively low optical quality can be used above the condensers they have been necessarily of relatively large size since large diameter condensers are usually utilized with negatives measuring four inches by five inches and larger. On the other hand filters used in the optical path beneath the lens are of much smaller size and thus much simpler to handle but these have to be of execptionally good optical quality to prevent distortions of the image-forming light beam.

It is accordingly the object of the present invention to provide a variable contrast light source for use with a condenser system wherein the color filters are of small size and need not be of the expensive high optical quality type.

Another object of the present invention is the provision of a variable contrast light source for use with a condenser system for the making of photographic prints and enlargements wherein small size filters are utilized of mediocre quality and in which a continuous change of contrast can be effected by operation of a control knob with such contrast change being readable on a dial.

The foregoing objects, together with others which will become readily apparent to those skilled in the art as the following description proceeds, are achieved in accordance with the present invention by the provision of filters of complementary colors to the primary colors to which the variable contrast paper is sensitive, which filters are adjustably positioned directly in front of the primary light source used with the photographic enlarger apparatus. By rotation of a knob aligning with a dial scale the color filters are adjustable as desired in front of an electric lamp to cause a light source of variable contrast to be produced. Such variable contrast light source is then projected into an integrating sphere where diffused light of uniform density per unit area is produced. This integrating sphere is provided with a relatively small opalized exit window spaced from the condensers of the enlarger the same distance as the primary light source in the customary condenser systems of the prior art, so that for all intent and purposes the small opalized exit window of the present invention itself actually constitutes the light source for the condenser type enlarger. However, it differs from the light source heretofore utilized with condenser type enlargers by virtue of the fact that instead of producing light fixed by the light source itself, the light source of the present invention radiates variable contrast light which is controllable so as to be entirely compatible with the variable contrast paper used at any time for the making of a photographic print or enlargement with a condenser system enlarger.

The present invention may be more fully appreciated by referencec to the accompanying drawing wherein.

Figure 1:
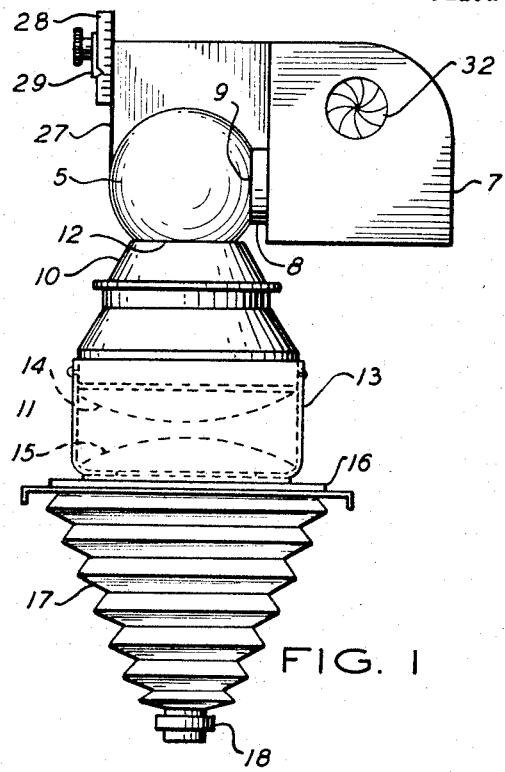
FIGURE 1 is an elevational view of a photographic enlarger for the making of prints and enlargements and provided with a light source of variable contrast which in conjunction with variable contrast sensitized paper will produce prints of variable contrast.

Referring now to the drawings in detail the variable contrast photographic enlarger as shown in FIG. 1 is of the condenser system type and comprises a mixing chamber in the form of a small sphere 5 provided with an interior white coating 6 (FIG. 2) of the highest diffuse reflection. A lamp compartment 7 is disposed to one side of such sphere and is connected thereto by a casting or the like 8 which forms an entrance window 9 for admitting light into the sphere, as hereinafter described more in detail. A graduated diverging casting 10 is disposed beneath the sphere 5 and houses an exit window 12 for the emanation of a diffusely reflected evenly distributed light flux. A lens housing 13 is connected to the diverging casting 10 and encases the customary condensing lenses 14 and 15 and immediately therebeneath is the usual reciprocally movable film stage 16 for supporting the negative or transparency to be printed or enlarged. The condenser system enlarger apparatus also is provided with the usual bellows 17 for properly focusing the enlarger lens 18.

Figure 2:
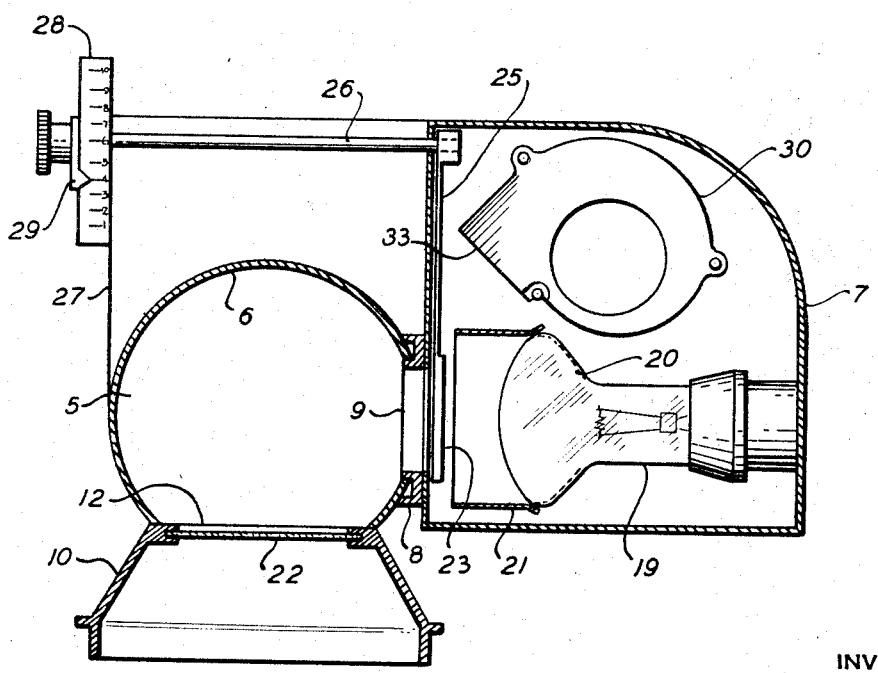
FIG. 2 is a fragmentary sectional view of the photographic enlarger of FIG. 1 and showing the variable contrast light source of the present invention.

By reference now more particularly to FIG. 2, it will be noted that the lamp compartment 7 has an electric incandescent lamp 19 mounted therein, which as shown is of the 200 watt reflector type for directing the light outwardly through its elliptically-shaped end in the direction of the sphere entrance window 9. Since the silverized reflecting surface 20 of the lamp 19 does not sufficiently concentrate the light beam an extended alzak finished light collector 21 surrounds the lamp end which thus increases the light flux passing through the entrance window 9 by as much as forty-five percent. This light flux is then diffusely reflected by the coating 6 on the interior surface of the sphere 5 and then passes outwardly through the exit window 12. However, this exit window 12 is provided with an opalized plastic or glass disc filter 22 of relatively small light transmission area approximating two inches by two inches and which is spaced from the condensers 14 and 15 the customary distance that the usual incandescent lamp is placed with conventional type condenser enlargers, so as to produce the same diffused light flux falling upon the condensers 14 and 15.

Figure 3:
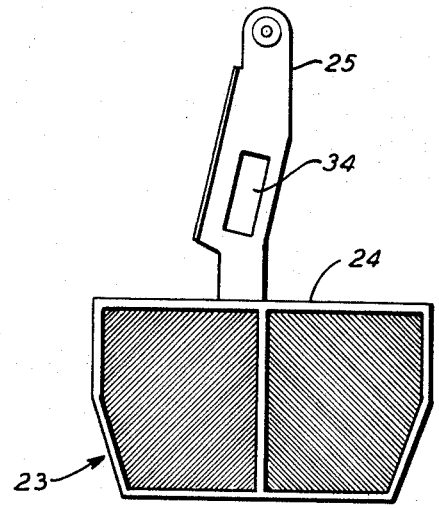
FIG. 3 is an elevational view of the color filters which form a part of the variable contrast source of the present invention.

It will also be noted from FIG. 2 that colored filters 23 are arranged to intercept the light beam projected through the entrance window 9. These filters are of a color complementary to that to which the variable contrast paper is responsive. For example, some variable contrast paper will render a soft print with green light and a contrast print with blue light and hence with such type paper the filters 23 would then be of the complementary colors of yellow and magenta. As shown in FIG. 3 these filters 23 are mounted in a holder 24 connected to an arm 25. The upper end of the arm 25 is secured to a shaft 26 one end of which is journaled for rotation in the front wall of the lamp housing 7 while its other outer end is journaled in a face plate 27 extending upwardly from the sphere 5. A circumferentially disposed scale 28 is also carried by the face plate 27 so that a pointer knob 29 on the outer end of the shaft 26 registers with the indicia of the scale to indicate to an operator the position of the filters 23 at any given moment. Accordingly by turning the knob 29 the shaft 26 will cause swinging movement of the filters 23 across the path of the light emerging from the alzak light collector 21 and thus select either green light, blue light, or a blending thereof, for projection through the sphere entrance window 9, depending upon the precise position to which filters 23 are moved by the operator when registering the pointer knob 29 with a predetermined scale indicia. Obviously, whatever the color selection the complete mixing thereof is done by the integrating sphere 5, so that only the completely mixed color of uniform density per unit area and preselected contrast, falls upon the opalized filter 22 which thus becomes the sole variable contrast light source for the condenser system.

In order to prevent heat from the lamp 19 detrimentally affecting the filters 23, the lamp housing 7 encases a blower 30 having its air intake 32 on the side of the lamp housing 7 (FIG. 1), and its outlet 33 so positioned as to blow air directly on the adjacent surface of the filters 23 and through an opening 34 in the filter arm 25 to the reverse side of such filters 23. Also, in order to reduce the heat generated by the lamp 19 and at the same time prolong the life thereof, the present invention contemplates an electrical system whereby the voltage supplied to the lamp 19 can be reduced as desired. Moreover, in all instances where extremely high magnification or over-exposed negatives are not required to produce satisfactory prints such reduced lamp voltage will still produce sufficient printing speed. It is also to be understood that although only the two color filters for producing green and blue light have been herein shown and described additional color filters can just as readily be utilized so as to produce the full chromaticity range.

It should thus be apparent from the foregoing that a variable contrast light source particularly for condenser system enlargers has been disclosed wherein color filters are adjustably positioned directly in front of the primary light source so that a variable contrast colored light beam is then projected into an integrating sphere. Such color filters are adjustably variable and may be preset by an operator in accordance with a selected dial setting thereby producing a predetermined blended-color light beam of uniform density per unit area. This uniform density variable contrast light beam emerges from a small area window which is so spaced as to actually constitute the light source itself of the condenser system photographic enlarger thereby replacing the fixed light beam from the incandescent lamps heretofore employed in such systems.

Although one embodiment of the present invention has been herein shown and described it is to be understood that still further modifications thereof can be made without departing from the spirit and scope of the present invention.

I claim:

1. A condenser system photographic printer for the making of prints or enlargements of film transparencies and having a variable contrast light source spaced the customary distance from the condenser lenses of such system, said variable contrast light source comprising:
   (a) a housing provided with a reflectorized light source therein for producing a concentrated light beam and a light collector for increasing the light flux of said beam as it emerges from said housing,
   (b) a mixing chamber in the form of a hollow sphere having a high diffusely reflecting surface and provided with an entrance window for the admission of the concentrated light beam from said housing, and a small exit window in said mixing chamber disposed normal to its entrance window and spaced the usual distance from the condenser lenses of said printer, said exit window passing light to the normally spaced condensing lens of said photographic printer,
   (c) a plurality of color filters disposed adjacent the entrance window of said mixing chamber for varying the color of the concentrated light beam passing therethrough from the light source in said housing, and
   (d) control means carried by said photographic printer and operable to selectively move said color filters into and out of the concentrated light beam passing through said entrance window to produce light of predetermined variable contrast emerging from the exit window of said mixing chamber and constituting the light source passing through the usual condenser lenses of said photographic printer onto variable contrast photographic paper.

2. A condenser system photographic printer for the making of prints or enlargements of film transparencies and having a variable contrast light source spaced the customary distance from the condenser lenses of such system, said variable contrast light source comprising:
   (a) a housing provided with a reflectorized light source therein for producing a concentrated light beam and a light collector for increasing the light flux of said beam as it emerges from said housing,
   (b) a mixing chamber in the form of a hollow sphere having a high diffusely reflecting surface and provided with an entrance window for the admission of the concentrated light beam from said housing, and a small exit window in said mixing chamber disposed normal to its entrance window and having an opalized filter through which the emerging light beam of uniform density per unit area passes to the normally spaced condensing lenses of said photographic printer;
   (c) a plurality of color filters disposed adjacent the entrance window of said mixing chamber for varying the color of the concentrated light beam passing therethrough from the light source in said housing, and
   (d) control means carried by said photographic printer and operable to selectively move said color filters into and out of the concentrated light beam passing through said entrance window to produce light of predetermined variable contrast emerging from the exit window of said mixing chamber and constituting the light source passing through the usual condenser lenses of said photographic printer on the variable contrast sensitized photographic paper.

3. A condenser system photographic printer for the making of prints or enlargements of film transparencies and having a variable contrast light source spaced the customary distance from the condenser lenses of such system, said variable contrast light source comprising:
   (a) a housing provided with a reflectorized light source therein for producing a concentrated light beam and a light collector for increasing the light flux of said beam as it emerges from said housing,
   (b) a mixing chamber in the form of a hollow sphere having a high diffusely reflecting surface and provided with an entrance window for the admission of the concentrated light beam from said housing, and a small exit window in said mixing chamber disposed normal to its entrance window and having an opalized filter through which the emerging light beam of uniform density per unit area passes to the normally spaced condensing lenses of said photographic printer;
   (c) a plurality of color filters disposed adjacent the entrance window of said mixing chamber for varying the color of the concentrated light beam passing therethrough from the light source in said housing, (d) control means carried by said photographic printer including a pointer and operable to selectively move said color filters into and outer of the concentrated light beam passing through said entrance window to produce light of predetermined variable contrast emerging from the exist window of said mixing chamber and constituting the light source passing through the usual condenser lenses of said photographic printer on to variable contrast sensitized photographic paper, and (e) a dial carried by said photographic printer adjacent the path of movement of the pointer of said control means and provided with graduations thereon indicative of a preselected variable contrast for the light source and produced by color mixing with said filters upon operation of said control means.

4. A condenser system photographic printer for the making of prints or enlargements of film transparencies and having a variable contrast light source spaced the customary distance from the condenser lenses of such system, said variable contrast light source comprising:

(a) a housing provided with a reflectorized light source therein for producing a concentrated light beam and a light collector for increasing the light flux of said beam as it emerges from said housing, (b) a mixing chamber in the form of a hollow sphere having a high diffusely reflecting surface and provided with an entrance window for the admission of the concentrated light beam from said housing, and a small exit window in said mixing chamber disposed normal to its entrance window and having an opalized filter through which the emerging light beam of uniform density per unit area passes to the normally spaced condensing lenses of said photographic printer;

(c) a plurality of color filters disposed adjacent the entrance window of said mixing chamber for varying the color of the concentrated light beam passing therethrough from the light source in said housing, (d) control means carried by said photographic printer including a pointer and operable to selectively move said color filters into and out of the concentrated light beam passing through said entrance window to produce light of predetermined variable contrast emerging from the exit window of said mixing chamber and constituting the light source passing through the usual condenser lenses of said photographic printer on a variable contrast sensitized photographic paper, (e) a dial carried by said photographic printer adjacent the path of movement of the printer of said control means and provided with graduations thereon indicative of a preselected variable contrast for the light source and produced by color mixing with said filters upon operation of said control means to align said pointer with a selected dial graduation, and (f) a blower in said housing and operable to direct a stream of cooling air in the direction of the entrance window of said mixing chamber and over the surfaces of said color filters to reduce the temperature thereof.

References Cited

UNITED STATES PATENTS 3,077,140   2/1963   Simmon et al.

NORTON ANSHER, *Primary Examiner.*

R. A. WINTERCORN, *Assistant Examiner.*